United States Patent
Ichimura et al.

(10) Patent No.: US 10,283,283 B2
(45) Date of Patent: May 7, 2019

(54) SEPARATOR FOR POWER STORAGE DEVICE, AND POWER STORAGE DEVICE USING SAME

(71) Applicant: Nippon Kodoshi Corporation, Kochi (JP)

(72) Inventors: Takumi Ichimura, Kochi (JP); Naoki Fujimoto, Kochi (JP); Norihiro Wada, Kochi (JP); Gaku Matsuoka, Kochi (JP)

(73) Assignee: NIPPON KODOSHI CORPORATION, Kochi (JP)

( * ) Notice: Subject to any disclaimer, the term of this patent is extended or adjusted under 35 U.S.C. 154(b) by 120 days.

(21) Appl. No.: 15/405,765

(22) Filed: Jan. 13, 2017

(65) Prior Publication Data

US 2017/0133165 A1    May 11, 2017

Related U.S. Application Data

(63) Continuation of application No. PCT/JP2015/070301, filed on Jul. 15, 2015.

(30) Foreign Application Priority Data

Jul. 18, 2014 (JP) ................. 2014-148234

(51) Int. Cl.
| | |
|---|---|
| *H01G 11/52* | (2013.01) |
| *H01G 9/02* | (2006.01) |
| *H01G 11/50* | (2013.01) |
| *H01G 11/58* | (2013.01) |
| *H01M 2/16* | (2006.01) |

(52) U.S. Cl.
CPC ............... *H01G 11/52* (2013.01); *H01G 9/02* (2013.01); *H01G 11/50* (2013.01); *H01G 11/58* (2013.01); *H01M 2/162* (2013.01); *H01M 2/1686* (2013.01); *Y02E 60/13* (2013.01)

(58) Field of Classification Search
CPC ...................................................... H01G 11/52
See application file for complete search history.

(56) References Cited

U.S. PATENT DOCUMENTS

| | | | | |
|---|---|---|---|---|
| 6,310,763 B1 * | 10/2001 | Suhara | ............... | H01G 9/02 361/508 |
| 6,411,496 B1 * | 6/2002 | Suhara | ............... | H01G 9/02 361/502 |

FOREIGN PATENT DOCUMENTS

| | | |
|---|---|---|
| JP | 2000003834 A | 1/2000 |
| JP | 2011035373 A | 2/2011 |
| JP | 2013171905 A | 9/2013 |

* cited by examiner

*Primary Examiner* — Eric W Thomas
(74) *Attorney, Agent, or Firm* — Edell, Shapiro & Finnan, LLC

(57) ABSTRACT

A separator for an electric double-layer capacitor is provided having a double-layer structure made of a fibrous layer A obtained by papermaking using a Fourdrinier net or a tanmo net, and a fibrous layer B obtained by papermaking using a cylinder net. The fibrous layer A is a layer that is refined until a CSF value decreases once to 0 ml (lower limit), and further refined until it turns to rise to 10 to 600 ml, the fibrous layer B is a layer that is refined until a CSF value of 700 to 0 ml, and the fibrous layer A and the fibrous layer B contain 70% by mass or more refinable, regenerated cellulose fibers. The density of the entire double-layer structure is 0.25 to 0.65 g/cm$^3$, and the thickness of the same is 10 to 150 μm. This allows provision of a separator for an electric double-layer capacitor having excellent tensile strength and tear strength, provision of a degree of mechanical strength such that the separator does not break in a manufacturing process of a wound or a stacked type electric double-layer capacitor, and improvement of productivity without adversely affecting internal resistance and leakage current properties of the capacitor as an energy storage device.

12 Claims, 1 Drawing Sheet

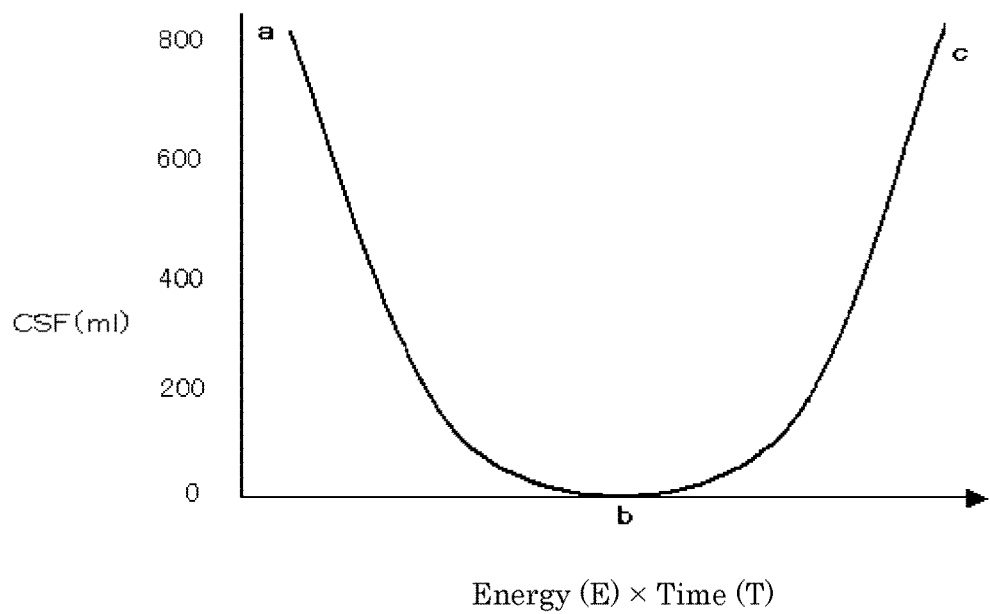

SEPARATOR FOR POWER STORAGE DEVICE, AND POWER STORAGE DEVICE USING SAME

TECHNICAL FIELD

The present invention relates to a separator for an energy storage device and an energy storage device using said separator. More specifically, it relates to a separator for an energy storage device that is suitable for electric double-layer capacitors, and an electric double-layer capacitor that is an energy storage device using said separator.

BACKGROUND

An energy storage device, for example, an electric double-layer capacitor is a capacitor utilizing an electric double-layer phenomenon in which electric charges opposing each other are respectively accumulated on the surface of the polarizable electrode and the electrolyte interface when the polarizable electrode is put into contact with the electrolytic solution. This capacitor is typically constituted by a pair of facing polarizable electrodes, a separator electrically and physically separating the pair of polarizable electrodes, and an organic electrolytic solution. Activated carbon powder having a large charge storage interface, namely a large specific surface area is used as the polarizable electrodes.

Since this electric double-layer capacitor has a large electrode surface area and can achieve a significantly larger capacitance than an aluminum electrolytic capacitor that is recognized as having a large capacitance for capacitors, it has been mainly used for memory backup applications of household electric appliances. In recent years, large capacitance electric double-layer capacitors have been a focus of attention, and use thereof has been broadened to various applications, such as for OA equipment and industrial machinery, vehicles, and power generation by solar light and wind.

There are three kinds of this electric double-layer capacitor by structure: a coin type capacitor, a wound type capacitor, and a stacked type capacitor, and capacitance thereof is determined by the specific surface area of the electrode acting as the charge storage interface.

The coin type capacitor is formed by binding minute activated carbon fibers or activated carbon powder using a binder, impregnating an electrolytic solution into a separator that is interleaved between a pair of polarizable electrodes in parallel therewith, which have been made into a mat form and then punched out into circular forms, and then housed in a metal case which is also functioning as an exterior case, and caulking a metal lid via a gasket so as to seal it.

The wound type capacitor is formed by applying micronized activated carbon on a metal foil surface, which is a charge collector, using a binder in order to increase the electrode material surface area, thereby configuring electrodes, and then interleaving a separator between this pair of configured electrodes and winding them so as to make a capacitor element, which is then housed in a metal case, filled with an electrolytic solution, and then sealed.

The stacked type capacitor is formed by applying micronized activated carbon on a metal foil surface, which is a charge collector, using a binder in order to increase the electrode material surface area, thereby configuring electrodes, and then stacking these activated carbon electrodes alternately with a separator so as to make a capacitor element, which is then housed in either a metal case or a multilayer laminated film using thick aluminum foil, filled with an electrolytic solution, and then sealed.

Large capacitance electric double-layer capacitors for which applications have recently been expanding have been employing the wound type or the stacked type structure. The large capacitance type is used for regenerative energy for vehicles and also used for wind turbine generators and solar power generation systems having great load fluctuation. With this usage, excellent instantaneous charging and discharging and a long cycle life are desired.

Lowering the resistance of the capacitor is necessary for making the electric double-layer capacitor have a long cycle life. If the internal resistance is high, heat generates from internal loss due to the resistance when charging and discharging a large current over a short period of time, thereby degrading performance as a result of the generated heat. Improvement of various members such as electrode material and electrolytic solution is actively carried out for lowering the resistance of the electric double-layer capacitor, and demand for lower resistance of separators has grown.

Moreover, in order to improve productivity in the wake of the expansion of the market due to expansion of applications of the electric double-layer capacitor, a separator that is strong enough to allow improvement in productivity without adversely affecting the internal resistance and leakage current characteristics of the separator is in demand.

A regenerated cellulose fiber separator described in Patent Document 1, a multilayer separator containing regenerated cellulose and synthetic fibers described in Patent Document 2, and a double-layer separator resulting from stacking a layer containing regenerated cellulose fibers and a porous polyolefin film layer described in Patent Document 3 are the examples of suitable separators for the conventional wound and stacked type electric double-layer capacitors.

Certain patent documents as described herein are as follows:
Patent Document 1: JP 2000-3834A
Patent Document 2: JP 2013-171905A
Patent Document 3: JP 2011-35373A Using a separator made of 100% by mass refinable, regenerated cellulose fibers as described in Patent Document 1 has a problem that the separator breaks in the manufacturing process of the wound and stacked type electric double-layer capacitors due to low tear strength.

This is thought to be due to the following reason. A sheet of paper made using minute fibrils of several tens of nm to several μm that are obtained by highly refining the refinable, regenerated cellulose fibers is a sheet having excellent ESR characteristics formed with very dense fiber mats but not increasing density since the rigidity of the fibrils is high and therefore do not easily collapse. Moreover, since inter-fiber hydrogen bonding increases due to increase in fibrils, the value of tensile strength can be increased.

However, while the tensile strength improves as a result of increasing inter-fiber bonding by refining refinable, regenerated cellulose fibers, the tear strength will rapidly decrease if the fibers are further refined to increase the inter-fiber bonding. That is, since the tensile strength and the tear strength due to the inter-fiber bonding of the fibers that have been refined to a certain degree have a reciprocal relationship, the more the tensile strength improves, the higher the fibers are refined and the more the tear strength decreases.

Here, there is a problem that the leakage current of the electric double-layer capacitor increases since not only the tensile strength but the shielding property decreases if refining is restricted so as to improve the tear strength.

Furthermore, a separator having excellent mechanical strength using a multilayer separator including high a density layer resulting from mixing refinable, regenerated cellulose and synthetic fiber, and a low density layer resulting from mixing refinable, regenerated cellulose and synthetic fiber is proposed as in Patent Document 2. However, the separator used in the working example of Patent Document 2 has problems that the inter-fiber hydrogen bonding is weakened into a separator with a large amount of fuzz due to a high content of synthetic fiber, thereby some of its fibers falling off due to the fuzz of the separator made when fabricating an electric double-layer capacitor, resulting in an increase in the leakage current of the electric double-layer capacitor.

This is because the shape and strength of the cellulose separator are maintained not only by mechanical strength due to intertwining of fibers but also by the chemical force of the hydrogen bonding among cellulose molecules.

Furthermore, a separator having excellent mechanical strength using a double-layer separator that results from stacking a porous polyolefin layer on a mixed layer of refinable, regenerated cellulose and synthetic fiber is proposed as described in Patent Document 3. However, there is a problem that the porous polyolefin film has fewer air gaps than the cellulose separator, thereby inhibiting ionic conduction in an electrolytic solution, resulting in degradation of ESR.

SUMMARY OF THE INVENTION

The present invention has been devised in light of the previously noted problems, and aims to provide a separator for energy storage devices having excellent tensile strength and tear strength. Moreover, it aims to provide an energy storage device allowing improvement in productivity without adversely affecting the internal resistance and leakage current characteristics by using this separator.

An embodiment of the present invention has the following configuration, for example, as a means for resolving the above problems and achieving said aim. That is, a separator for an energy storage device is interleaved between a pair of polarizable electrodes and capable of retaining an electrolytic solution containing electrolyte. The separator is characterized in that it comprises a double-layer structure made of a fibrous layer A obtained by papermaking using a Fourdrinier net or a tanmo net, and a fibrous layer B obtained by papermaking using a cylinder net. The fibrous layer A and the fibrous layer B contain 70% by mass or more refinable, regenerated cellulose fibers, and density of the entire double-layer structure is 0.25 to 0.65 $g/cm^3$ and thickness of the entire double-layer structure is 10 to 150 µm.

Furthermore, for example, a separator is interleaved between a pair of polarizable electrodes and capable of retaining an electrolytic solution containing electrolyte. The separator is characterized in that it comprises a double-layer structure made of a fibrous layer A obtained by papermaking using a Fourdrinier net or a tanmo net, and a fibrous layer B obtained by papermaking using a cylinder net. The fibrous layer A and the fibrous layer B contain 70% by mass or more refinable, regenerated cellulose fibers, and density of the entire double-layer structure is 0.35 to 0.55 $g/cm^3$ and thickness of the entire double-layer structure is 20 to 60 µm.

Yet further, for example, the separator is characterized in that the fibrous layer A results from making paper using regenerated cellulose fibers that are refined until a CSF value decreases once to 0 ml (lower limit), and further refined until it turns to rise to 10 to 600 ml, and that the fibrous layer B results from making paper using regenerated cellulose fibers that are refined until a CSF value reaches 700 to 0 ml.

Yet even further, for example, the separator is characterized in that the regenerated cellulose fibers are selected from solvent spun rayon fibers and viscose regenerated cellulose fibers.

Yet even further, for example, an energy storage device is characterized by using any one of the aforementioned separators for an energy storage device. Yet even further, for example, the energy storage device is characterized by being either an electric double-layer capacitor or a lithium ion capacitor.

Thus, in accordance with the present invention, a separator for an energy storage device having excellent tensile strength and tear strength may be provided. Moreover, use of said separator allows provision of an energy storage device capable of improving productivity without adversely affecting internal resistance and leakage current properties.

BRIEF DESCRIPTION OF DRAWINGS

FIG. 1 is a diagram illustrating a relationship between the product of energy and time of a refining process for a separator constructional material and the refined CSF values (ml) of an embodiment of the present invention.

DETAILED DESCRIPTION

An embodiment of the present invention is explained with reference to a drawing hereafter. This embodiment of the present invention employs a measured value of freeness of regenerated cellulose, which has been measured in accordance with JIS P8121-2 'Pulps-Determination of drainability—Part 2: "Canadian Standard" freeness method.' The Canadian standard freeness represents the amount of the filtered water in ml that has been collected from the side orifice of a Canadian standard freeness tester.

More specifically, it is a method of measuring the amount of the filtered water that passes through a fiber mat formed on a sieve plate having ninety seven 0.5 mm-diameter holes per 1 $cm^2$, and is discharged from the side orifice in a measurement funnel.

Refinable, regenerated cellulose is made finer through refining. When trying to filter the refined, regenerated cellulose through the sieve plate, since it is affected by the fiber mat that is accumulated initially and formed on the sieve plate, and the resistance of the slurry passing through thus increases, the freeness gradually decreases until reaching 0 ml as the regenerated cellulose is being made finer through refining.

Here, it has been determined that if refining is continued even further, the amount of minute fibers to pass through the holes of the sieve plate increases and the freeness rises. This state is illustrated in FIG. 1. FIG. 1 is a diagram illustrating a relationship between the execution time of a refining process for separator constructional material (regenerated cellulose fiber) and the refined CSF values (ml) of the embodiment of the present invention.

As shown in FIG. 1, making the regenerated cellulose finer by refining gradually lowers the freeness CSF value (a in FIG. 1), decreasing once until 0 ml (b in FIG. 1). It is revealed thereafter that when refining is further continued, the CSF value rises (c in FIG. 1) due to increase in minute fibers passing through the holes of the sieve plate.

With the embodiment of the present invention, a raw material that is refined until the CSF value decreases once to 0 ml (lower limit), and a raw material that is further refined until the CSF turns to rise are used. Note that the horizontal axis gives the product of refining energy and time when refining the separator constructional material.

The separator of the embodiment is interleaved between a pair of polarizable electrodes, is capable of holding an electrolytic solution containing electrolyte, and has a double-layer structure made of a fibrous layer A, which is obtained by papermaking using a Fourdrinier net or a tanmo net, and a fibrous layer B, which is obtained by papermaking using a cylinder net. The fibrous layers A and B contain 70% by mass or more regenerated cellulose fibers, the overall density of the double-layer structure is 0.25 to 0.65 g/cm$^3$, and thickness is 10 to 150 μm.

Alternatively, the separator of the embodiment is interleaved between a pair of polarizable electrodes, is capable of holding an electrolytic solution containing electrolyte, and has a double-layer structure made of a fibrous layer A, which is obtained by papermaking using a Fourdrinier net or a tanmo net, and a fibrous layer B, which is obtained by papermaking using a cylinder net. The fibrous layers A and B contain 70% by mass or more regenerated cellulose fibers, the overall density of the double-layer structure is 0.35 to 0.55 g/cm$^3$, and thickness is 20 to 60 μm.

The fibrous layer A adopts a raw material (regenerated cellulose fiber) that is refined until the CSF value decreases once to 0 ml (lower limit), and then further refined until it turns to rise to 10 to 600 ml. On the other hand, the fibrous layer B adopts a raw material (regenerated cellulose fiber) that has a CSF value of 700 to 0 ml.

Through adoption of the above fibrous layers, the embodiment can provide a separator for energy storage devices that has excellent tensile strength and tear strength. Moreover, using said separator makes it possible to improve productivity of energy storage devices without adversely affecting the internal resistance and leakage current characteristics.

Furthermore, for example, it is suitable to assume a capacitor as the energy storage device, and the capacitor can include electric double-layer capacitors. In the following description, an example using a capacitor, more specifically an electric double-layer capacitor as the energy storage device using the separator of the embodiment is described. However, use of the separator for other energy storage devices or capacitors is not excluded.

As a result of testing and research on various materials and constructional ratios in addition to the examples given in the embodiment and working examples, as mentioned earlier, it is evident that favorable results are obtained through use of a double-layer structure made of a fibrous layer A, which is obtained by papermaking using a Fourdrinier net or a tanmo net and containing 70% by mass or more regenerated cellulose fibers that are refined until the CSF value decreases once to 0 ml (lower limit) and then further refined until it turns to rise to 10 to 600 ml, and a fibrous layer B, which is obtained by papermaking using a cylinder net and containing 70% by mass or more regenerated cellulose fibers that are refined until a CSF value of 700 to 0 ml.

Use of a double-layer structure made of a fibrous layer A, which is obtained by papermaking using a Fourdrinier net or a tanmo net and containing 70% by mass or more regenerated cellulose fibers that are refined until the CSF value decreases once to 0 ml (lower limit) and then further refined until it turns to rise to 10 to 600 ml, and a fibrous layer B, which is obtained by papermaking using a cylinder net and containing 70% by mass or more regenerated cellulose fibers that are refined until a CSF value of 700 to 0 ml allows compatibility between tensile strength and tear strength, which have a reciprocal relationship.

The electric double-layer capacitor using the separator of the embodiment is fabricated by impregnating and holding an electrolytic solution in the separator portion and isolating the pair of polarizable electrodes by the separator.

Description of separator: The separator of the embodiment has a double-layer structure fabricated by combining two fiber mats together made from a raw material made of refined, refinable regenerated cellulose fibers or another raw material using a paper making machine: one that is formed through either a Fourdrinier net or a cylinder net, and the other that is formed through a cylinder net, with a Fourdrinier/cylinder machine, a tanmo/cylinder machine, etc. Alternatively, a double-layer structured separator may be fabricated by binding two separators together in a later processing: one that is formed using a Fourdrinier machine and a cylinder machine, and the other that is formed using a tanmo machine and a cylinder machine.

Note that the regenerated cellulose fibers include cuprammonium regenerated cellulose fibers made using a wet spinning method, viscose regenerated cellulose fibers, and solvent spun regenerated cellulose fibers using a solution as a spinning dope made by dissolving cellulose with an organic solvent, such as N-methylmorpholine-N-oxide, or the like, into a molecular form. Of these, representative refinable, regenerated cellulose fibers are polynosic rayon as the viscose regenerated cellulose fibers, and lyocell as the solvent spun rayon fibers, and use of these regenerated cellulose fibers allows easy formation of fibrous layers.

Fibrils obtained by refining the regenerated cellulose fibers have a small fiber diameter and weak inter-fiber bonding power. Therefore, while the fibers and the fibrils are bonded together at entangling points, they are not bonded at surfaces and lines, thereby having a characteristic of not degrading internal resistance. This is the reason why the refinable, regenerated cellulose fibers are blended in the embodiment. However, it is not limited to the above example, and any kind of fiber may be used as long as it is refinable, regenerated cellulose fibers. For example, the fibers are not limited to the polynosic rayon fibers and the lyocell fibers given in the following detailed structure.

The separator for capacitors is desired not to cause degradation of internal resistance and leakage current when incorporated in the electric double-layer capacitor. Therefore, while there is no particular limit on other fibers to be mixed in with the refinable raw material, natural cellulose fibers, such as hemp pulp, Manila fiber pulp, esparto pulp, wood craft pulp, cotton pulp, may be used. Moreover, refinable synthetic fibers, such as aramid, acrylic, and ultra-fine fibers, such as polypropylene, polyethylene (called "PE" hereafter), polyethylene terephthalate (called "PET" hereafter), polyphenylenesulfide, polyethylene naphthalate, may be selected. Moreover, while it depends on the fiber diameter, the refinable synthetic fibers may be used without refining if the fiber diameter is small enough.

The content of the refinable raw material of the refinable, regenerated cellulose fibers is preferably 70% by mass or higher. If the content of the refinable raw material of the refinable, regenerated cellulose fibers is less than 70% by mass, the high content of other fibers may cause to increase the internal resistance or the leakage current of the electric double-layer capacitor. For example, in the case of a high content of natural cellulose fibers, the internal resistance of the electric double-layer capacitor is likely to increase. This is because since the fibrils that are generated from refining the natural fibers hydrogen bond to each other, the higher the rate of fibril generation, the easier the fibers bond together.

When this inter-fiber bonding is excessive, the fibers aggregate in a sheet form, acting like a film, and thereby inhibiting ion permeability. Moreover, for example, when the content of synthetic fibers is high, the sheet surface is easily worn down due to weak inter-fiber bonding power, thereby becoming a sheet with a large amount of fuzz. Therefore, when manufacturing an electric double-layer capacitor, fibers will fall off due to the sheet fuzz, which may cause to increase the leakage current of the electric double-layer capacitor.

Density of the double-layer separator is preferably 0.25 to 0.65 g/cm$^3$, and more preferably 0.35 to 0.55 g/cm$^3$. If the density of the separator is under 0.25 g/cm$^3$, tensile strength and tear strength are too low, and therefore a short-circuit defect may occur due to breaking of the separator in the manufacturing process of the wound or the stacked type electric double-layer capacitor. Meanwhile, if the density of the separator exceeds 0.65 g/cm$^3$, there is a problem that gaps in the separator decrease, thereby inhibiting ion permeability and degrading the internal resistance of the electric double-layer capacitor.

Thickness of the double-layer separator is preferably 10 to 150 μm, more preferably 20 to 60 μm. This is because even with the double-layer structured separator according to the embodiment of the present invention, if the thickness of the separator is under 10 μm, the tensile strength and tear strength of the separator weaken, and the shielding property of the separator decreases while a short-circuit defect may occur due to breakage of the separator in the manufacturing process of the wound or the stacked type electric double-layer capacitor. Meanwhile, if the thickness of the separator exceeds 150 μm, a problem that the internal resistance of the electric double-layer capacitor degrades since the interelectrode distance in the electric double-layer capacitor lengthens due to the thicker separator.

As to the refining degree of the fibrous layer A, it is preferable that the CSF value of the refinable raw material is decreased once until 0 ml (lower limit) by refining, and then further refined until it turns to rise to 10 to 600 ml. When it is refined until the CSF value decreases once to 0 ml (lower limit), and then further refined and turns to rise only to less than 10 ml, the tensile strength of the separator weakens, and a short circuit defect may occur due to breakage of the separator in the manufacturing process of the wound or the stacked type electric double-layer capacitor. Moreover, the shielding property decreases, making the electric double-layer capacitor have a high leakage current.

If the CSF value decreases once to 0 ml (lower limit) and is then further refined and turns to rise higher than 600 ml, the wet paper strength becomes weaker since the fiber length becomes shorter, and thereby there is a possibility that the separator cannot be manufactured in the paper making process for the separator.

As to the refining degree of the fibrous layer B, it is preferable that the refinable raw material is refined until the CSF value is 700 to 0 ml. The case of a CSF value higher than 700 ml is in a state including many unrefined fibers and having a weak inter-fiber bond, thereby possibly increasing the amount of fibers dropping off due to fuzz on the separator. When the amount of fibers falling off increases, thickness of the falling-off area becomes thinner; therefore, the shielding property of the separator decreases, resulting in an electric double-layer capacitor having a high leakage current. Moreover, there is a possibility that fibers that have fallen off will adhere to the manufacturing machine in the manufacturing process of the electric double-layer capacitor, thereby reducing productivity of the electric double-layer capacitor. As a result, it is necessary to periodically stop the manufacturing line so as to remove the fibers that have fallen off.

If the CSF value decreases once to 0 ml (lower limit), and then through further continuing to refine, the CSF value turns to rise, the tear strength weakens due to excessive increase in inter-fiber hydrogen bonding. As a result, there is a possibility of a short circuit defect occurring due to breakage of the separator in the manufacturing process of the wound or the stacked type electric double-layer capacitor, thereby reducing productivity of the electric double-layer capacitor.

The separator configuration given above provides a favorable separator both in capacitor characteristics and manufacturing process of the electric double-layer capacitor. Namely, it is a good separator having enough tensile strength and tear strength so as to be manufactured without breaking in the manufacturing process of the wound or the stacked type electric double-layer capacitor, and also having the electrical characteristics of an electric double-layer capacitor.

Evaluation method of separator: Specific measurements of each characteristic of the separator and the electric double-layer capacitor of the embodiment are conducted under the following conditions using the following methods.

Measurement of thickness: Thickness of the separator is measured using the method of folding into ten pieces of paper, which is described in '5.1.3 Case of folding paper and measuring thickness' using the micrometer of '5.1.1 Measuring device and measuring method, a) Case using an external micrometer' regulated in JIS C 2300-2 'Cellulosic papers for electrical purposes'—Part 2: 'Methods of test', 5.1 Thickness.

Measurement of density: Density of the separator in an absolute dry state is measured using the method regulated in Method B of JIS C 2300-2 'Cellulosic papers for electrical purposes'—Part 2: 'Methods of test', 7.0 A Density.

Measurement of tensile strength: Longitudinal tensile strength of the separator is measured using the method regulated in JIS C 2300-2 'Cellulosic papers for electrical purposes'—Part 2: 'Methods of test', 8 Tensile strength and stretching.

Measurement of tear strength: Lateral tear strength of the separator is measured using the method regulated in JIS C 2300-2 'Cellulosic papers for electrical purposes'—Part 2: 'Methods of test', 9 Tear strength.

Manufacture of electric double-layer capacitor using the separator: An example applying the separator of the embodiment to the electric double-layer capacitor is described. Activated carbon electrodes (Product name: SW-1 made by Nippon Graphite Industries, Co., Ltd.) for electric double-layer capacitors are used as the electrodes of the embodiment. Moreover, an electrolytic solution (Product name: LIPASTE-EAF1N made by Tomiyama Pure Chemical Industries, Ltd.) resulting from dissolving a tetraethyl ammonium tetrafluoroborate solute in a propylene carbonate solvent is used ('LIPASTE' is a registered trademark of Tomiyama Pure Chemical Industries, Ltd.)

Manufacture method of electric double-layer capacitor: A manufacture method of the electric double-layer capacitor using the separator of the embodiment is described next. Activated carbon electrodes and the separator of the present invention are wound together like a scroll, that wound body is then stored in a bottomed cylindrical aluminum case, and once it is vacuum-impregnated with an electrolytic solution, it is sealed using a sealing rubber, thereby manufacturing an electric double-layer capacitor.

Evaluation method of electric double-layer capacitor: A wound type electric double-layer capacitor having a rated voltage of 2.5 V is manufactured, and capacitance (C), internal resistance (Z), and leakage current (LC) are measured as capacitor characteristics.

Capacitance of electric double-layer capacitor: Once the electric double-layer capacitor is charged to a rated voltage of 2.5 V and the voltage is retained for 30 minutes, it is discharged at a constant current of 10 mA, and then time T is measured from 2.0 V until it decreases to 1.0 V so as to calculate the capacitance (C) by the following formula:

$$C=\text{Discharge current (10 mA)} \times T \quad \text{(Formula 1)}$$

Internal resistance of electric double-layer capacitor: The internal resistance (Z) of the electric double-layer capacitor is measured using an LCR meter with an alternating current of 1 mA and a frequency of 1 kHz.

Leakage current of electric double-layer capacitor: The leakage current (LC) of the electric double-layer capacitor is measured in the following manner: the electric double-layer capacitor is charged up by a rated voltage of 2.5 V and then charging is continued for 30 minutes at a constant voltage during which the leakage current is measured.

Short-circuit defective fraction of the electric double-layer capacitor is represented by the resulting value in percentage from dividing the number of the defective electric double-layer capacitors by 1000 where the case of the charged voltage not increasing to the rated voltage 2.5 V when measuring the capacitance of the electric double-layer capacitor is regarded as a short-circuit defect.

WORKING EXAMPLES

Specific working examples according to the separator of the embodiment according to the present invention described above are described below. The separator of the working examples is a nonwoven cloth obtained by a paper making method using regenerated cellulose using either a Fourdrinier/cylinder machine or a tanmo/cylinder machine. That is, the separator is constituted by a wet nonwoven cloth.

Working Example 1

A double-layer separator having a thickness of 10 μm and density of 0.25 g/cm$^3$ is made using the Fourdrinier/cylinder machine. A fibrous layer A made by paper-making using a Fourdrinier net is a layer having a thickness of 5 μm and density of 0.30 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 10 ml. A fibrous layer B made by paper-making using a cylinder net is a layer having a thickness of 5 μm and density of 0.20 g/cm$^3$, and uses 100% by mass lyocell fibers, which are regenerated cellulose fibers, as a paper-making raw material, wherein this raw material is refined until the CSF value reaches 700 ml.

Working Example 2

A double-layer separator having a thickness of 10 μm and density of 0.65 g/cm$^3$ is made using the Fourdrinier/cylinder machine. A fibrous layer A made by paper-making using a Fourdrinier net is a layer having a thickness of 5 μm and density of 0.72 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 600 ml. A fibrous layer B made by paper-making using a cylinder net is a layer having a thickness of 5 μm and density of 0.58 g/cm$^3$, and uses 100% by mass lyocell fibers, which are regenerated cellulose fibers, as a paper-making raw material, wherein this raw material is refined until the CSF value reaches 0 ml.

Working Example 3

A double-layer separator having a thickness of 20 μm and density of 0.65 g/cm$^3$ is made using the tanmo/cylinder machine. A fibrous layer A made by paper-making using a tanmo net is a layer having a thickness of 10 μm and density of 0.72 g/cm$^3$, and uses 100% by mass polynosic rayon fibers, which are regenerated cellulose fibers, as a paper-making raw material, wherein this raw material is refined until the CSF value decreases once to 0 ml (lower limit), and then further refined until it turns to rise to 550 ml. A fibrous layer B made by paper-making using a cylinder net is a layer having a thickness of 10 μm and density of 0.58 g/cm$^3$, and uses 100% by mass polynosic rayon fibers, which are regenerated cellulose fibers, as a paper-making raw material, wherein this raw material is refined until the CSF value reaches 10 ml.

Working Example 4

A double-layer separator having a thickness of 20 μm and density of 0.55 g/cm$^3$ is made using the Fourdrinier/cylinder machine. A fibrous layer A made by paper-making using a Fourdrinier net is a layer having a thickness of 10 μm and density of 0.65 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 400 ml. A fibrous layer B made by paper-making using a cylinder net is a layer having a thickness of 10 μm and density of 0.45 g/cm$^3$, and uses 100% by mass lyocell fibers, which are regenerated cellulose fibers, as a paper-making raw material, wherein this raw material is refined until the CSF value reaches 50 ml.

Working Example 5

A double-layer separator having a thickness of 150 μm and density of 0.25 g/cm$^3$ is made using the Fourdrinier/cylinder machine. A fibrous layer A made by paper-making using a Fourdrinier net is a layer having a thickness of 50 μm and density of 0.35 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 10 ml. A fibrous layer B made by paper-making using a cylinder net is a layer having a thickness of 100 μm and density of 0.20 g/cm$^3$, and uses 100% by mass lyocell fibers, which are regenerated cellulose fibers, as a paper-making raw material, wherein this raw material is refined until the CSF value reaches 690 ml.

Working Example 6

A double-layer separator having a thickness of 150 μm and density of 0.65 g/cm$^3$ is made using the Fourdrinier/ cylinder machine. A fibrous layer A made by paper-making using a Fourdrinier net is a layer having a thickness of 100 μm and density of 0.72 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 580 ml. A fibrous layer B made by paper-making using a cylinder net is a layer having a thickness of 50 μm and density of 0.51 g/cm$^3$, and uses 100% by mass lyocell fibers, which are regenerated cellulose fibers, as a paper-making raw material, wherein this raw material is refined until the CSF value reaches 10 ml.

Working Example 7

A double-layer separator having a thickness of 40 μm and density of 0.40 g/cm$^3$ is made using the Fourdrinier/cylinder machine. A fibrous layer A made by paper-making using a Fourdrinier net is a layer having a thickness of 25 μm and density of 0.46 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 200 ml. A fibrous layer B made by paper-making using a cylinder net is a layer having a thickness of 15 μm and density of 0.30 g/cm$^3$, and uses 100% by mass lyocell fibers, which are regenerated cellulose fibers, as a paper-making raw material, wherein this raw material is refined until the CSF value reaches 100 ml.

Working Example 8

A double-layer separator having a thickness of 40 μm and density of 0.40 g/cm$^3$ is made using the Fourdrinier/cylinder machine. A fibrous layer A made by paper-making using a Fourdrinier net is a layer having a thickness of 25 μm and density of 0.46 g/cm$^3$, and uses 70% by mass lyocell fibers, which are regenerated cellulose fibers, and 30% by mass hemp, which is natural fiber, as a paper-making raw material, wherein this raw material is refined until the CSF value decreases once to 0 ml (lower limit), and then further refined until it turns to rise to 200 ml. A fibrous layer B made by paper-making using a cylinder net is a layer having a thickness of 15 μm and density of 0.30 g/cm$^3$, and uses 70% by mass lyocell fibers, which are regenerated cellulose fibers, and 30% by mass hemp, which is natural fiber, as a paper-making raw material, wherein this raw material is refined until the CSF value reaches 100 ml.

Working Example 9

A double-layer separator having a thickness of 70 μm and density of 0.25 g/cm$^3$ is made using the Fourdrinier/cylinder machine. A fibrous layer A made by paper-making using a Fourdrinier net is a layer having a thickness of 25 μm and density of 0.34 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 30 ml. A fibrous layer B made by paper-making using a cylinder net is a layer having a thickness of 45 μm and density of 0.20 g/cm$^3$, and uses 100% by mass lyocell fibers, which are regenerated cellulose fibers, as a paper-making raw material, wherein this raw material is refined until the CSF value reaches 650 ml.

Working Example 10

A double-layer separator having a thickness of 60 μm and density of 0.25 g/cm$^3$ is made using the Fourdrinier/cylinder machine. A fibrous layer A made by paper-making using a Fourdrinier net is a layer having a thickness of 25 μm and density of 0.33 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 10 ml. A fibrous layer B made by paper-making using a cylinder net is a layer having a thickness of 35 μm and density of 0.19 g/cm$^3$, and uses 100% by mass lyocell fibers, which are regenerated cellulose fibers, as a paper-making raw material, wherein this raw material is refined until the CSF value reaches 700 ml.

Working Example 11

A double-layer separator having a thickness of 60 μm and density of 0.35 g/cm$^3$ is made using the Fourdrinier/cylinder machine. A fibrous layer A made by paper-making using a Fourdrinier net is a layer having a thickness of 25 μm and density of 0.37 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 50 ml. A fibrous layer B made by paper-making using a cylinder net is a layer having a thickness of 35 μm and density of 0.34 g/cm$^3$, and uses 100% by mass lyocell fibers, which are regenerated cellulose fibers, as a paper-making raw material, wherein this raw material is refined until the CSF value reaches 30 ml.

Working Example 12

A double-layer separator having a thickness of 60 μm and density of 0.35 g/cm$^3$ is made using the Fourdrinier/cylinder machine. A fibrous layer A made by paper-making using a Fourdrinier net is a layer having a thickness of 25 μm and density of 0.37 g/cm$^3$, and uses 70% by mass lyocell fibers, which are regenerated cellulose fibers, and 30% by mass PET fibers, which are synthetic fibers, as a paper-making raw material, wherein this raw material is refined until the CSF value decreases once to 0 ml (lower limit), and then further refined until it turns to rise to 50 ml. A fibrous layer B made by paper-making using a cylinder net is a layer having a thickness of 35 μm and density of 0.34 g/cm$^3$, and uses 70% by mass lyocell fibers, which are regenerated cellulose fibers, and 30% by mass PET fibers, which are synthetic fibers, as a paper-making raw material, wherein this raw material is refined until the CSF value reaches 30 ml.

Comparative Example 1

Manufacturing a double-layer separator having a thickness of 10 μm and density of 0.23 g/cm$^3$ has been attempted. As the paper-making raw material of the fibrous layer A that is made by paper-making using a Fourdrinier net, 100% by mass lyocell fibers, which are regenerated cellulose fibers, are used, and the raw material is refined until the CSF value decreases once to 0 ml (lower limit), and then further refined until it turns to rise to 10 ml. As the paper-making raw material of the fibrous layer B that is made by paper-making using a cylinder net, 100% by mass lyocell fibers, which are regenerated cellulose fibers, are used, and the raw material is refined until the CSF value reaches 700 ml. However, breakage occurred repeatedly in the drying process, and a separator could not be obtained as a result.

Comparative Example 2

Manufacturing a double-layer separator having a thickness of 8 μm and density of 0.25 g/cm$^3$ has been attempted. As the paper-making raw material of the fibrous layer A that is made by paper-making using a Fourdrinier net, 100% by mass lyocell fibers, which are regenerated cellulose fibers, are used, and the raw material is refined until the CSF value decreases once to 0 ml (lower limit), and then further refined until it turns to rise to 50 ml. As the paper-making raw material of the fibrous layer B that is made by paper-making using a cylinder net, 100% by mass lyocell fibers, which are regenerated cellulose fibers, are used, and the raw material is refined until the CSF value reaches 650 ml. However, breakage occurred repeatedly in the drying process, and a separator could not be obtained as a result.

Comparative Example 3

Manufacturing a double-layer separator having a thickness of 8 μm and density of 0.65 g/cm$^3$ has been attempted using a Fourdrinier/cylinder machine. As the paper-making raw material of the fibrous layer A that is made by paper-making using a Fourdrinier net, 100% by mass lyocell fibers, which are regenerated cellulose fibers, are used, and the raw material is refined until the CSF value decreases once to 0 ml (lower limit), and then further refined until it turns to rise to 650 ml. As the paper-making raw material of the fibrous layer B that is made by paper-making using a cylinder net, 100% by mass lyocell fibers, which are regenerated cellulose fibers are used, and the raw material is refined until the CSF value reaches 0 ml. However, since the fibrous layer A failed to proceed from the paper-making wire to the pressing process, a separator could not be obtained as a result. This is thought to be because while this was aimed to improve the tensile strength of the separator by continuing refining of the fibrous layer A, the fiber length became shorter and the wet paper strength became weaker due to over refining the fibrous layer A.

Comparative Example 4

A double-layer separator having a thickness of 8 μm and density of 0.70 g/cm$^3$ is made using the Fourdrinier/cylinder machine. A fibrous layer A made by paper-making using a Fourdrinier net is a layer having a thickness of 5 μm and density of 0.72 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 600 ml. In addition, a fibrous layer B made by paper-making using a cylinder net is a layer having a thickness of 3 μm and density of 0.67 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 10 ml.

Comparative Example 5

A double-layer separator having a thickness of 160 μm and density of 0.25 g/cm$^3$ is made using the Fourdrinier/cylinder machine. A fibrous layer A made by paper-making using a Fourdrinier net is a layer having a thickness of 60 μm and density of 0.35 g/cm$^3$, and uses 100% by mass lyocell fibers, which are regenerated cellulose fibers, as a paper-making raw material, wherein this raw material is refined until the CSF value decreases once to 0 ml (lower limit), and then further refined until it turns to rise to 10 ml. A fibrous layer B made by paper-making using a cylinder net is a layer having a thickness of 100 μm and density of 0.19 g/cm$^3$, and uses 100% by mass lyocell fibers, which are regenerated cellulose fibers, as a paper-making raw material, wherein this raw material is refined until the CSF value reaches 750 ml.

Comparative Example 6

A double-layer separator having a thickness of 160 μm and density of 0.65 g/cm$^3$ is made using the Fourdrinier/cylinder machine. A fibrous layer A made by paper-making using a Fourdrinier net is a layer having a thickness of 100 μm and density of 0.72 g/cm$^3$, and uses 100% by mass lyocell fibers, which are regenerated cellulose fibers, as a paper-making raw material, wherein this raw material is refined until the CSF value reaches 600 ml. A fibrous layer B made by paper-making using a cylinder net is a layer having a thickness of 60 μm and density of 0.53 g/cm$^3$, and uses 100% by mass lyocell fibers, which are regenerated cellulose fibers, as a paper-making raw material, wherein this raw material is refined until the CSF value reaches 0 ml.

Comparative Example 7

A double-layer separator having a thickness of 250 μm and density of 0.39 g/cm$^3$ is made using the Fourdrinier/cylinder machine. A fibrous layer A made by paper-making using a Fourdrinier net is a layer having a thickness of 167 μm and density of 0.39 g/cm$^3$, and uses 100% by mass lyocell fibers, which are regenerated cellulose fibers, as a paper-making raw material, wherein this raw material is refined until the CSF value reaches 0 ml. A fibrous layer B made by paper-making using a cylinder net is a layer having a thickness of 83 μm and density of 0.39 g/cm$^3$, and uses 100% by mass lyocell fibers, which are regenerated cellulose fibers, as a paper-making raw material, wherein this raw material is refined until the CSF value reaches 0 ml.

A double-layer separator having a thickness of 150 μm and density of 0.65 g/cm$^3$ is then obtained by calendering said separator. The fibrous layer A after calendering has a thickness of 100 μm and density of 0.65 g/cm$^3$, and the fibrous layer B has a thickness of 50 μm and density of 0.65 g/cm$^3$.

Comparative Example 8

A double-layer separator having a thickness of 40 μm and density of 0.40 g/cm$^3$ is made using the Fourdrinier/cylinder machine. A fibrous layer A made by paper-making using a Fourdrinier net is a layer having a thickness of 25 μm and density of 0.46 g/cm$^3$, and uses as a paper-making raw material, 60% by mass lyocell fibers, which are regenerated cellulose fibers, and 40% by mass hemp, which is natural fiber, wherein this raw material is refined until the CSF value decreases once to 0 ml (lower limit), and then further refined until it turns to rise to 200 ml. A fibrous layer B made by paper-making using a cylinder net is a layer having a thickness of 15 μm and density of 0.30 g/cm$^3$, and uses as a paper-making raw material, 70% by mass lyocell fibers, which are regenerated cellulose fibers, and 30% by mass hemp, which is natural fiber, wherein this raw material is refined until the CSF value reaches 100 ml.

Comparative Example 9

A double-layer separator having a thickness of 40 μm and density of 0.40 g/cm$^3$ is made using the Fourdrinier/cylinder machine. A fibrous layer A made by paper-making using a Fourdrinier net is a layer having a thickness of 25 μm and density of 0.46 g/cm$^3$, and uses as a paper-making raw material, 70% by mass lyocell fibers, which are regenerated cellulose fibers, and 30% by mass hemp, which is natural fiber, wherein this raw material is refined until the CSF value decreases once to 0 ml (lower limit), and then further refined until it turns to rise to 200 ml. A fibrous layer B made by paper-making using a cylinder net is a layer having a thickness of 15 μm and density of 0.30 g/cm$^3$, and uses as a paper-making raw material, 60% by mass lyocell fibers, which are regenerated cellulose fibers, and 40% by mass hemp, which is natural fiber, wherein this raw material is refined until the CSF value reaches 100 ml.

Comparative Example 10

A double-layer separator having a thickness of 60 μm and density of 0.35 g/cm$^3$ is made using the Fourdrinier/cylinder machine. A fibrous layer A made by paper-making using a Fourdrinier net is a layer having a thickness of 25 μm and density of 0.36 g/cm$^3$, and uses as a paper-making raw material, 60% by mass lyocell fibers, which are regenerated cellulose fibers, and 40% by mass PET fibers, which are synthetic fibers, wherein this raw material is refined until the CSF value decreases once to 0 ml (lower limit), and then further refined until it turns to rise to 50 ml. A fibrous layer B made by paper-making using a cylinder net is a layer having a thickness of 35 μm and density of 0.34 g/cm$^3$, and uses as a paper-making raw material, 70% by mass lyocell fibers, which are regenerated cellulose fibers, and 30% by mass PET fibers, which are synthetic fibers, wherein this raw material is refined until the CSF value reaches 30 ml.

Comparative Example 11

A double-layer separator having a thickness of 60 μm and density of 0.35 g/cm$^3$ is made using the Fourdrinier/cylinder machine. A fibrous layer A made by paper-making using a Fourdrinier net is a layer having a thickness of 25 μm and density of 0.37 g/cm$^3$, and uses as a paper-making raw material, 70% by mass lyocell fibers, which are regenerated cellulose fibers, and 30% by mass PET fibers, which are synthetic fibers, wherein this raw material is refined until the CSF value decreases once to 0 ml (lower limit), and then further refined until it turns to rise to 50 ml. A fibrous layer B made by paper-making using a cylinder net is a layer having a thickness of 35 μm and density of 0.34 g/cm$^3$, and uses as a paper-making raw material, 60% by mass lyocell fibers, which are regenerated cellulose fibers, and 40% by mass PET fibers, which are synthetic fibers, wherein this raw material is refined until the CSF value reaches 30 ml.

Conventional Example 1

A separator is made using the Fourdrinier machine, using 100% by mass lyocell fibers, which are regenerated cellulose fibers, as a paper-making raw material. A separator having a thickness of 40 μm and density of 0.40 g/cm$^3$, resulting from refining the raw material until reaching a CSF value of 0 ml is obtained.

Conventional Example 2

A double-layer separator having a thickness of 40 μm and density of 0.51 g/cm$^3$ is made using the tanmo/cylinder machine, using as a paper-making raw material, lyocell fibers, which are regenerated cellulose fibers, and PET fibers, which are synthetic fibers. A fibrous layer A made by paper-making using a tanmo net is a layer having a thickness of 17 μm and density of 0.58 g/cm$^3$, and uses a mixture of 50% by mass lyocell fibers and 50% by mass PET fibers, wherein the raw material is refined until the CSF value reaches 0 ml. A fibrous layer B made by paper-making using a cylinder net is a layer having a thickness of 23 μm and density of 0.46 g/cm$^3$, and uses a mixture of 50% by mass lyocell fibers and 50% by mass PET fibers, wherein this raw material is refined until the CSF value reaches 50 ml.

Conventional Example 3

A double-layer separator having a thickness of 60 μm and density of 0.35 g/cm$^3$ is made by stacking a fibrous layer A and a fibrous layer B; where the fibrous layer A is made using lyocell fibers, which are regenerated cellulose fibers, and PET fibers, which are synthetic fibers, as paper-making raw materials, with a Standard sheet making machine regulated in JIS P822, and the fibrous layer B is made out of PE pulp as a raw material with a film manufacturing apparatus. The fibrous layer A is a layer having a thickness of 40 μm and density of 0.22 g/cm$^3$, and is made out of a mixture of 80% by mass lyocell fibers and 20% by mass PET fibers as a raw material, where the mixture is refined until the CSF value reaches 0 ml, while the fibrous layer B is a layer having a thickness of 20 μm and density of 0.61 g/cm$^3$. The fibrous layer B is made by melting and extruding high-density PE pulp (specific gravity: 0.96) through a T die-type extruder so as to make a film, subjecting the resulting film to heating in a hot-air circulating oven, and then stretching it between nip rolls.

Electric double-layer capacitors having a cell size of 60 mmφ×138 mmL, a rated voltage of 2.5V, and a capacity of 3000 F are made using the separators of Working Examples 1 to 4 and Comparative Example 4. An electric double-layer capacitor having a cell size of 10 mmφ×20 mmL, a rated voltage of 2.5V, and a capacity of 1 F is made using the separator of Working Example 5. Electric double-layer capacitors having a cell size of 18 mmφ×40 mmL, a rated voltage of 2.5V, and a capacity of 50 F are made using the separators of Working Example 6 and Comparative Examples 6 and 7. Electric double-layer capacitors having a cell size of 36 mmφ×64 mmL, a rated voltage of 2.5V, and a capacity of 300 F are made using the separators of Working Examples 7 and 8, Comparative Examples 8 and 9, and Conventional Examples 1 and 2. Electric double-layer capacitors having a cell size of 22 mmφ×45 mmL, a rated voltage of 2.5V, and a capacity of 100 F are made using the separators of Working Examples 9 to 12, Comparative Examples 10 and 11, and Conventional Example 3. The separator of Comparative Example 6 has its surface worn down and a large amount of fibers falling off due to fuzz, and therefore could not be used.

Evaluation results of the individual respective separators of the Working examples, Comparative Examples 1 to 11, and Conventional Examples 1 to 3 mentioned above, and performance evaluation results of the electric double-layer capacitors are given in Table 1. In order to differentiate the differences in refining degree in Table 1, CSF values that have decreased once to 0 ml (lower limit) and then have turned to rise after further refining have been marked with an asterisk. One thousand electric double-layer capacitors for each category are fabricated, and the averages of various measurements are given.

TABLE 1

| | Separator composition | | | | | | Electric double-layer capacitor characteristics | | | | |
|---|---|---|---|---|---|---|---|---|---|---|---|---|
| | Fibrous layer A | | | Fibrous layer B | | | Separator physical properties | | | | | | | |
| | Raw material name | Blending quantity % | CSF ml | Raw material name | Blending quantity % | CSF ml | Thickness μm | Density g/cm³ | Tensile strength N/15 mm | Tear strength mN | Capacity C F | Internal resistance Z mΩ | Leakage current LC mA | Short circuit percent defective |
| Working Example 1 | Lyocell | 100 | *10 | Lyocell | 100 | 700 | 10 | 0.25 | 5.9 | 90 | 3000 | 0.4 | 4.5 | 2.9 |
| Working Example 2 | Lyocell | 100 | *600 | Lyocell | 100 | 0 | 10 | 0.65 | 7.8 | 120 | 3000 | 0.7 | 1.7 | 1.6 |
| Working Example 3 | Polynosic rayon | 100 | *550 | Polynosic rayon | 100 | 10 | 20 | 0.65 | 9.8 | 140 | 5000 | 0.9 | 0.9 | 0 |
| Working Example 4 | Lyocell | 100 | *400 | Lyocell | 100 | 50 | 20 | 0.55 | 7.8 | 170 | 5000 | 0.5 | 1.1 | 0 |
| Comparative Example 1 | Lyocell | 100 | *10 | Lyocell | 100 | 700 | 10 | 0.25 | — | — | — | — | — | — |
| Comparative Example 2 | Lyocell | 100 | *50 | Lyocell | 100 | 650 | 8 | 0.25 | — | — | 3000 | — | — | — |
| Comparative Example 3 | Lyocell | 100 | *650 | Lyocell | 100 | 0 | 8 | 0.65 | — | — | 5000 | — | — | — |
| Comparative Example 4 | Lyocell | 100 | *600 | Lyocell | 100 | *10 | 8 | 0.70 | 4.9 | 50 | 5000 | 1.4 | 6.8 | 29.6 |
| Working Example 5 | Lyocell | 100 | *10 | Lyocell | 100 | 690 | 150 | 0.25 | 10.8 | 540 | 1 | 110 | 0.05 | 1.4 |
| Comparative Example 5 | Lyocell | 100 | *10 | Lyocell | 100 | 750 | 160 | 0.25 | 11.8 | 320 | — | — | — | — |
| Working Example 6 | Lyocell | 100 | *550 | Lyocell | 100 | 10 | 150 | 0.65 | 20.6 | 610 | 50 | 14.5 | 0.1 | 0 |
| Comparative Example 6 | Lyocell | 100 | *600 | Lyocell | 100 | 0 | 160 | 0.65 | 21.6 | 630 | 50 | 58.7 | 0.1 | 0 |
| Comparative Example 7 | Lyocell | 100 | *0 | Lyocell | 100 | 0 | 150 | 0.65 | 7.8 | 640 | 50 | 15.9 | 0.4 | 1.5 |
| Working Example 7 | Lyocell | 100 | *200 | Lyocell | 100 | 100 | 40 | 0.40 | 12.7 | 460 | 300 | 4.5 | 0.9 | 0 |
| Working Example 8 | Lyocell Hemp | 70 30 | *200 | Lyocell Hemp | 70 30 | 100 | 40 | 0.40 | 14.7 | 540 | 300 | 5.8 | 1.1 | 0 |
| Comparative Example 8 | Lyocell Hemp | 60 40 | *200 | Lyocell Hemp | 70 30 | 100 | 40 | 0.40 | 15.7 | 530 | 300 | 10.7 | 1.5 | 1.3 |
| Comparative Example 9 | Lyocell Hemp | 70 30 | *200 | Lyocell Hemp | 60 40 | 100 | 40 | 0.40 | 13.7 | 530 | 300 | 9.6 | 1.3 | 0.8 |
| Conventional Example 1 | Lyocell | 100 | 0 | — | — | — | 40 | 0.40 | 12.7 | 150 | 300 | 4.4 | 0.9 | 2.1 |
| Conventional Example 2 | Lyocell PET | 50 50 | 0 | Lyocell PET | 50 50 | 50 | 40 | 0.51 | 6.9 | 100 | 300 | 4.1 | 3.9 | 14.1 |
| Working Example 9 | Lyocell | 100 | *30 | Lyocell | 100 | 650 | 70 | 0.25 | 8.8 | 160 | 100 | 5.4 | 0.7 | 0.8 |
| Working Example 10 | Lyocell | 100 | *10 | Lyocell | 100 | 700 | 60 | 0.25 | 7.8 | 120 | 100 | 5.3 | 0.8 | 1.7 |
| Working Example 11 | Lyocell | 100 | *50 | Lyocell | 100 | 30 | 60 | 0.35 | 9.8 | 200 | 100 | 5.4 | 0.5 | 0 |
| Working Example 12 | Lyocell PET | 70 30 | *50 | Lyocell PET | 70 30 | 30 | 60 | 0.35 | 6.9 | 140 | 100 | 5.3 | 0.6 | 1.0 |
| Comparative Example 10 | Lyocell PET | 60 40 | *50 | Lyocell PET | 70 30 | 30 | 60 | 0.35 | 5.9 | 130 | 100 | 5.3 | 1.9 | 4.6 |
| Comparative Example 11 | Lyocell PET | 70 30 | *50 | Lyocell PET | 60 40 | 30 | 60 | 0.35 | 7.8 | 80 | 100 | 5.5 | 2.2 | 5.0 |
| Conventional Example 5 | Lyocell PET | 80 20 | 0 | PE | 100 | — | 60 | 0.35 | 20.6 | 500 | 100 | 15.6 | 0.2 | 0 |

In order to differentiate the differences of refining degree of a fibrous layer A and a fibrous layer B, CSF values that have decreased once to 0 ml (lower limit) and then have turned to rise after further refining have been marked with an asterisk.

The respective working examples, comparative examples, and conventional examples are described in detail below.

The separators of Working Examples 1 to 4 have thicknesses of 10 μm and 20 μm and densities of 0.25 to 0.65 g/cm³. These separators of Working Examples 1 to 4 and the electric double-layer capacitors made using them show satisfactory performance. On the other hand, since the separator of Comparative Example 4 has a thickness of 8 μm, which is thinner than the separators of Working Examples 1 to 4, and the refining degree of the fibrous layer B is advanced, tear strength is weak. As a result, the short-circuit percent defective of the electric double-layer capacitor is 29.6%, which is high.

Moreover, while the internal resistance of the electric double-layer capacitor of Comparative Example 4 is higher than that of Working Example 3 even though the thickness is 8 μm, this is thought to be caused by the high separator density of 0.70 g/cm³. Therefore, if the thickness of the separator is thicker than 10 μm and the density is 0.25 to 0.65 g/cm³, the separator is suitable for the electric double-layer capacitor. Furthermore, the refining degree of the fibrous layer B needs to be kept under a CSF value of 0 ml in order for the separator to have enough tear strength.

Comparing Working Example 2 with Working Example 3, Working Example 3 showed more favorable leakage current and short-circuit percent defective. This is because the tensile strength and the tear strength became stronger since the thickness of the separator of Working Example 3 is 20 μm. Through a comparison between Working Example 3 and Working Example 4, Working Example 4 showed a lower density of the separator, thereby reducing the internal resistance of the electric double-layer capacitor.

The separator of Comparative Example 5 has a thickness of 160 μm and density of 0.25 g/cm³. Since the refining degree of the fibrous layer B is 750 ml, which means it has not been refined enough yet, many fibers have fallen off due to a large amount of fuzz on the separator in the manufacturing process of the electric double-layer capacitor, and thus could not be submitted for evaluation of the electric double-layer capacitor.

Meanwhile, Working Example 5 is a separator having a thickness of 150 μm and density of 0.25 g/cm³. Of this separator, some fibers have fallen off in the manufacturing process of the electric double-layer capacitor, but the electric double-layer capacitor has shown satisfactory performance. As a result, in order to control fibers from falling off, the refining degree of the fibrous layer B needs to be kept under a CSF value of 700 ml.

Comparing Working Example 6 with Comparative Example 6, the internal resistance of the electric double-layer capacitor using the separator of Comparative Example 6 was higher at 38.7 mΩ. This is because the inter-electrode distance of the electric double-layer capacitor is longer due to the thicker separator of Comparative Example 6. As to the electric double-layer capacitor using the separator of Comparative Example 7, it has a short-circuit percent defective of 1.5%. This is because the refining degree of the fibrous layer A has a low CSF value of 0 ml, which has made the tensile strength of the separator weaker.

This shows that the refining degree of the fibrous layer A needs to be further refined from a CSF value of 0 ml. In comparison among the electric double-layer capacitors of Working Example 6 and Comparative Examples 6 and 7, the internal resistance of Comparative Example 6 is the highest. It can be understood from this that if the thickness of a separator exceeds 150 μm, the internal resistance of an electric double-layer capacitor will increase.

The electric double-layer capacitors using the separators of Comparative Examples 8 and 9 have shown higher internal resistance than the electric double-layer capacitors using the separators of Working Examples 7 and 8. This is because the resistance of the separators themselves has weakened due to combining 40% by mass refined natural fibers to one of the fibrous layers. Since fibrils resulting from refining natural fibers hydrogen-bond to one another, the higher the degree of fibril generation, the easier it is for fibers to bind to one another. When this inter-fiber binding is excessive, the fibers aggregate in a sheet form, acting like a film, thereby inhibiting ion permeability. It can be understood from this that if the blending quantity of natural fibers is less than 30% by mass, it is suitable for use as a separator.

The separator of Conventional Example 1 has a single layer structure without a fibrous layer B. Because of this structure, tear strength of the separator is weaker, and the short-circuit percent defective of the electric double-layer capacitor using this separator is 2.1%. The separator of Conventional Example 2 has a 50% by mass PET fibers in the fibrous layer A and the fibrous layer B, and the bonding strength between the fibers constituting the separator is thus weak. As a result, the tensile strength and the tear strength of the separator are weak, there is a large quantity of fuzz on the surface of the separator, many fibers fall off, and the short-circuit percent defective is high.

The separators of Working Examples 9 to 12 have thicknesses of 60 μm and 70 μm and densities of 0.25 to 0.35 g/cm³. The separators of Working Examples 9 to 12 and the electric double-layer capacitors manufactured using them show satisfactory performance. Meanwhile, the separators of Comparative Examples 10 and 11 have 40% by mass PET fibers in one of the fibrous layers, thereby the separator having weak tensile strength or weak tear strength. As a result, there is fuzz on the surface of the separator, many fibers fall off, and the short-circuit percent defective is high. It can be understood from this that if the blending quantity of synthetic fibers is less than 30% by mass, it is suitable for use as a separator.

Comparing Working Example 9 with Working Example 11, Working Example 11 showed more favorable leakage current and short-circuit percent defective. Working Example 11 has a thickness of 60 μm, which is thinner than that of Working Example 9 and is thought to be caused by a high density of 0.35 g/cm³.

The separator of Conventional Example 3 has one of the fibrous layers as a polyolefin porous film. However, since the polyolefin porous film has fewer air gaps than a cellulose separator, the internal resistance of the electric double-layer capacitor is deteriorated more than in Working Examples 9 to 12.

According to the embodiment given above, a separator for an electric double-layer capacitor having a degree of mechanical strength such that the separator does not break when winding and stacking is provided; wherein the separator has a double-layer structure constituted by a fibrous layer A, which is obtained by papermaking using a Fourdrinier net or a tanmo net, and a fibrous layer B, which is obtained by papermaking using a cylinder net. The A and B fibrous layers are refined until the range given below, and contain 70% by mass or more regenerated cellulose fibers. The overall density of the double-layer structure is 0.25 to 0.65 g/cm³, and thickness of the same is 10 to 150 μm.

CSF values of fibrous layer A: CSF value decreases once to 0 ml (lower limit) and then is further refined until it turns to rise to 10 to 600 ml. CSF values of fibrous layer B: CSF 700 to 0 ml.

Moreover, use of said separator allows provision of an electric double-layer capacitor capable of improving productivity without adversely affecting internal resistance and leakage current properties.

The description given above is an example using the separator of the embodiment in an electric double-layer capacitor, but other structures of an electric double-layer capacitor and description of the details of the manufacturing method have been omitted. However, limiting electrode material and electrolytic solution material in the above-given wound type and the stacked type electric double-layer capacitors is not particularly necessary, and various materials may be used.

Moreover, the separator can be applied to not only the electric double-layer capacitor, but also various energy storage devices such as lithium ion capacitors, lithium ion batteries, lithium batteries, sodium ion batteries, aluminum electrolytic capacitors, and solid electrolytic capacitors.

What is claimed:

1. A separator for an energy storage device interleaved between a pair of polarizable electrodes and capable of retaining an electrolytic solution containing electrolyte, comprising:
    a double-layer structure made of a fibrous layer A and a fibrous layer B, wherein the fibrous layer A has a density of 0.30 to 0.72 g/cm$^3$, is obtained by regenerated cellulose fibers which are refined using a Fourdrinier machine or a tanmo machine until a Canadian Standard Freeness value decreases once to a lower limit of 0 ml, and which are further refined until a Canadian Standard Freeness value turns to rise to 10 to 600 ml, and the fibrous layer B is obtained by regenerated cellulose fibers which are refined using a cylinder machine until a Canadian Standard Freeness value reaches 700 to 0 ml; wherein
    the fibrous layer A and the fibrous layer B contain 70% by mass or more refinable, regenerated cellulose fibers, a density of the entire double-layer structure is 0.25 to 0.65 g/cm$^3$, a thickness of the entire double-layer structure is 10 to 150 μm, a tensile strength of the entire double-layer structure is 5.9 to 20.6 N/15 mm, and a tear strength of the entire double-layer structure is 90 to 610 mN.

2. The separator for an energy storage device according to claim 1, wherein the regenerated cellulose fibers are selected from the group consisting of solvent spun rayon fibers and viscose regenerated cellulose fibers.

3. The separator for an energy storage device according to claim 1, wherein the density of the entire double-layer structure is 0.35 to 0.55 g/cm$^3$ and the thickness of the entire double-layer structure is 20 to 60 μm.

4. The separator for an energy storage device according to claim 3, wherein the regenerated cellulose fibers are selected from solvent spun rayon fibers and viscose regenerated cellulose fibers.

5. An energy storage device using a separator for the energy storage device interleaved between a pair of polarizable electrodes and capable of retaining an electrolytic solution containing electrolyte, said separator comprising:
    a double-layer structure made of a fibrous layer A and a fibrous layer B, wherein the fibrous layer A has a density of 0.30 to 0.72 g/cm$^3$, is obtained by regenerated cellulose fibers which are refined using a Fourdrinier machine or a tanmo machine until a Canadian Standard Freeness value decreases once to a lower limit of 0 ml, and which are further refined until a Canadian Standard Freeness value turns to rise to 10 to 600 ml, and the fibrous layer B is obtained by regenerated cellulose fibers which are refined using a cylinder machine until a Canadian Standard Freeness value reaches 700 to 0 ml; wherein
    the fibrous layer A and the fibrous layer B contain 70% by mass or more refinable, regenerated cellulose fibers, a density of the entire double-layer structure is 0.25 to 0.65 g/cm$^3$, a thickness of the entire double-layer structure is 10 to 150 μm, a tensile strength of the entire double-layer structure is 5.9 to 20.6 N/15 mm, and a tear strength of the entire double-layer structure is 90 to 610 mN.

6. The energy storage device according to claim 5, wherein said energy storage device is an electric double-layer capacitor or a lithium ion capacitor.

7. The energy storage device according to claim 5, wherein the regenerated cellulose fibers are selected from solvent spun rayon fibers and viscose regenerated cellulose fibers.

8. The energy storage device according to claim 7, wherein said energy storage device is an electric double-layer capacitor or a lithium ion capacitor.

9. An energy storage device using a separator for the energy storage device interleaved between a pair of polarizable electrodes and capable of retaining an electrolytic solution containing electrolyte, said separator comprising:
    a double-layer structure made of a fibrous layer A and a fibrous layer B, wherein the fibrous layer A has a density of 0.30 to 0.72 g/cm$^3$, is obtained by regenerated cellulose fibers which are refined using a Fourdrinier machine or a tanmo machine until a Canadian Standard Freeness value decreases once to a lower limit of 0 ml, and which are further refined until a Canadian Standard Freeness value turns to rise to 10 to 600 ml, and the fibrous layer B is obtained by regenerated cellulose fibers which are refined using a cylinder machine until a Canadian Standard Freeness value reaches 700 to 0 ml; wherein
    the fibrous layer A and the fibrous layer B contain 70% by mass or more refinable, regenerated cellulose fibers, a density of the entire double-layer structure is 0.35 to 0.55 g/cm$^3$, a thickness of the entire double-layer structure is 20 to 60 μm, a tensile strength of the entire double-layer structure is 5.9 to 20.6 N/15 mm, and a tear strength of the entire double-layer structure is 90 to 610 mN.

10. The energy storage device according to claim 9, wherein said energy storage device is an electric double-layer capacitor or a lithium ion capacitor.

11. The energy storage device according to claim 9, wherein the regenerated cellulose fibers are selected from solvent spun rayon fibers and viscose regenerated cellulose fibers.

12. The energy storage device according to claim 11, wherein said energy storage device is an electric double-layer capacitor or a lithium ion capacitor.

* * * * *